Patented Apr. 18, 1939

2,154,917

UNITED STATES PATENT OFFICE 2,154,917

MANUFACTURE OF SODIUM HYDROSULPHIDE

Johann Schneider, Wolfen, Kreis Bitterfeld, Germany, assignor to I. G. Farbenindustrie Aktiengesellschaft, Frankfort-on-the-Main, Germany No Drawing. Application April 13, 1937, Serial No. 136,606. In Germany April 23, 1936

1 Claim. (Cl. 23—134)

The present invention relates to a process for manufacturing sodium hydrosulphide and, more particularly, to the production of crystallized hydrates of this sulphide, having a high content of NaSH.

In the usual manufacture of sodium hydrosulphide by passing sulphuretted hydrogen into sodium hydroxide solution or sodium sulphide solution there are obtained only viscous solutions of NaSH of about 30 per cent. strength. The solid hydrate obtainable from these solutions is very deliquescent in air and easily loses hydrogen sulphide. It has, therefore, been proposed to make an anhydrous, pulverulent sodium hydrosulphide by passing at about 300° C. hydrogen sulphide, free from oxygen, over solid, powdered sodium sulphide, the so-called crude melt. The product thus obtained, however, contains impurities of the sodium sulphide, chiefly finely subdivided carbon and the ash constituents of the carbon which has been used for reducing the sulphate. Such a product is not usable when it is a question of adding the solid hydrosulphide to materials such as dyestuffs which after dissolution are not to be subjected to filtration.

This invention relates to a simple manner of making crystallized hydrates of sodium hydrosulphide of high content of NaSH and is based on the observation that the highly concentrated melt of aqueous sodium hydrosulphide does not solidify as a whole when cooled, but in the course of the cooling separates into a solid and a liquid phase of which the former is essentially richer than the parent mass in NaSH and the liquid portion is essentially poorer in NaSH. It has been found that the curve of the melting points of the aqueous sodium hydrosulphide mass depends on the water content and represents a straight line from 150° C. (24 per cent. of $H_2O$) to about 350° C. (anhydrous melt). Products coming within this range of water content yield the more solid hydrosulphide of high per cent. strength the higher the initial content of the parent melt in NaSH; for example, from a melt liquid at 150° C. and containing 76 per cent. of NaSH there may be obtained by cooling to 80° C. approximately one half of the NaSH in the form of a crystalline sulphydrate containing 82.5 per cent. of NaSH, whereas the other half remains in the form of a liquid containing 70.5 per cent. of NaSH which may be used for dissolving $Na_2S$ and returned to the process of saturation with $H_2S$ to produce more NaSH.

For making the melt either the usual so-called crude melt of sodium sulphide may be used, which still contains finely sub-divided carbon and ash constituents derived from its manufacture, or the porous, essentially purer sodium sulphide obtained by reduction with hydrogen as described in U. S. Patent No. 1,916,803. In both cases the oxide and sulphide impurities separate in greater part in the course of the progressive formation of NaSH, so that by filtering there may be obtained a clear, nearly colorless melt.

The following example illustrates the invention:

500 parts by weight of water are first introduced whilst stirring into about 600 parts of powdered anhydrous sodium sulphide, whereupon hydrogen sulphide is passed through the mass until the chief portion of the sodium sulphide has been converted into NaSH. A fresh 500 parts of sodium sulphide are now added and hydrogen sulphide is again passed through until practically no $Na_2S$ can be detected in the melt. It is preferable to conduct the operation under reflux in order that steam may not be lost during the operation due to the rise of temperature up to about 150° C., which takes place. The melt having a temperature of at least 150° C. is then pressed with aid of compressed nitrogen or compressed air through either filtering stones or filtering cloths depending upon the quantity of the impurities to be removed. The melt is received in a vessel which is cooled with an exact control of the temperature to a degree dependent on the temperature at which crystals of sodium hydrosulphide of the desired low content of water separate, whereupon the crystals are separated from the liquid in a preferably pre-heated centrifuge, the liquid portion is returned to be used instead of water for dissolving a fresh quantity of sodium sulphide.

What I claim is:

The process for manufacturing crystallized hydrates of sodium hydrosulphide with a high content of NaSH, which comprises dissolving about 600 parts by weight of anhydrous sodium sulphide in about 500 parts by weight of water, passing hydrogen sulphide through the mass, then adding about 500 parts by weight of sodium sulphide and again passing hydrogen sulphide through the melt while operating under reflux at a temperature up to about 150° C., removing undissolved matter from the melt, allowing it to cool to about 80° C. and separating the crystalline sodium hydrosulphide formed.

JOHANN SCHNEIDER.